(12) United States Patent
Miyazaki et al.

(10) Patent No.: US 9,249,284 B2
(45) Date of Patent: Feb. 2, 2016

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventors: Tatsuya Miyazaki, Kobe (JP); Soh Ishino, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/230,773

(22) Filed: Mar. 31, 2014

(65) Prior Publication Data

US 2014/0296413 A1    Oct. 2, 2014

(30) Foreign Application Priority Data

Apr. 1, 2013    (JP) .................. 2013-076017

(51) Int. Cl.

| | |
|---|---|
| *C08L 7/00* | (2006.01) |
| *C08L 9/06* | (2006.01) |
| *C08L 21/00* | (2006.01) |
| *B60C 1/00* | (2006.01) |
| *B60C 9/02* | (2006.01) |
| *B60C 19/08* | (2006.01) |
| *C08K 3/04* | (2006.01) |
| *C08K 3/06* | (2006.01) |
| *C08K 3/22* | (2006.01) |
| *B29D 30/38* | (2006.01) |

(52) U.S. Cl.

CPC . *C08L 7/00* (2013.01); *B29D 30/38* (2013.01); *B60C 1/00* (2013.01); *B60C 1/0041* (2013.04); *B60C 9/02* (2013.01); *B60C 19/08* (2013.01); *B60C 19/084* (2013.04); *C08K 3/04* (2013.01); *C08K 3/06* (2013.01); *C08L 21/00* (2013.01); *B29D 2030/383* (2013.01); *B60C 2001/0066* (2013.04); *B60C 2001/0083* (2013.04); *C08K 2003/2296* (2013.01); *C08L 9/06* (2013.01); *Y02T 10/862* (2013.01)

(58) Field of Classification Search

CPC ............. C08L 21/00; C08L 7/00; C08L 9/06; C08K 2003/0856; C08K 2003/2296; C08K 3/04; C08K 3/06; C08K 3/08; C08K 3/22; B60C 19/08; B60C 19/084; B60C 2001/0066; B60C 1/00; B60C 9/02; B60C 1/0041; B60C 2001/0083; B29B 15/122; B29B 30/38; B29B 2030/383; B29D 2030/383; B29D 30/38; Y02T 10/862

USPC ..................... 152/152.1; 524/432, 526, 495

See application file for complete search history.

(56) References Cited

U.S. PATENT DOCUMENTS

| | | | |
|---|---|---|---|
| 2006/0266459 A1* | 11/2006 | Miyazaki ................ | 152/565 |
| 2009/0126844 A1* | 5/2009 | Nakamura ............... | 152/524 |
| 2010/0071817 A1* | 3/2010 | Burkholder et al. ..... | 152/152.1 |
| 2014/0206809 A1* | 7/2014 | Miyazaki ................ | 524/432 |

FOREIGN PATENT DOCUMENTS

| | | |
|---|---|---|
| EP | 2 165 853 A1 | 3/2010 |
| JP | 2009-143547 A | 7/2009 |
| JP | 2013-49418 A | 3/2013 |

OTHER PUBLICATIONS

DeGussa Creating Essential, Technical Information, Feb. 2005.*

* cited by examiner

*Primary Examiner* — Angela C Scott
(74) *Attorney, Agent, or Firm* — Birch, Stewart, Kolasch & Birch, LLP

(57) ABSTRACT

Provided are a rubber composition for tires which provides both adhesion to fiber cords and conductivity even when an inexpensive conductive carbon black is used, and thus achieves a balanced improvement in conductivity, handling stability, fuel economy, elongation at break, adhesion to fiber cords, processability, and tire durability; and a pneumatic tire including the composition. The composition includes, per 100 parts by mass of a rubber component: 1.0-3.5 parts by mass of sulfur with an iron content of 30 ppm or less, calculated as the net sulfur content in the sulfur; and 0.5-15 parts by mass of conductive carbon black having a DBP of 300 ml/100 g or more and an iron content of 60 ppm or more, the composition having a total net sulfur content of 1.0-6.0 parts by mass per 100 parts by mass of the rubber component, and a volume resistivity of $1.0 \times 10^8$ Ω·cm or less.

6 Claims, 2 Drawing Sheets

RUBBER COMPOSITION FOR TIRE, AND PNEUMATIC TIRE

TECHNICAL FIELD

The present invention relates to a rubber composition for a tire, and a pneumatic tire including the rubber composition.

BACKGROUND ART

Attempts have been made to improve the fuel economy of a vehicle by reducing the rolling resistance of a tire to suppress heat build-up. Tires with better fuel economy have recently become increasingly desired. Thus, several methods are used for better fuel economy, including reducing not only the heat build-up of a rubber for treads, but also reducing the heat build-up of a rubber for sidewalls or insulation, as well as reducing the thickness of a sidewall rubber.

Techniques used to reduce the heat build-up of a rubber include a technique of reducing the filling ratio of carbon black, and a technique of incorporating a filler such as silica to reduce the energy loss. These techniques reduce the rolling resistance of a tire, but are causing the problem of an increase in the electrical resistance of a tire because, for example, the amount of carbon black with good conductivity is reduced or the amount of silica with low conductivity is increased. An increase in the electrical resistance of a tire may lead to radio noise or cause an electrical discharge during fueling to ignite gasoline.

Meanwhile, a known method for suppressing an increase in the electrical resistance of a tire is to form a conductive path from the road surface to a rim using highly conductive rubber components, as taught in, for example, Patent Literature 1. Specifically, for example, as illustrated in FIG. 1, (1) a conducting rubber, (2) a breaker, (3) an insulation, an inner liner, a carcass and/or a sidewall, and (4) a clinch are formed of highly conductive rubber components; the conducting rubber is embedded in a tread so that it comes into contact with the road surface. With these, a conductive path is formed from the conducting rubber through the breaker, from the breaker through the insulation, inner liner, carcass and/or sidewall, and from these components to the clinch that is in contact with a rim. Thus, a conductive path can be formed from the road surface to the rim via (1) the conducting rubber, (2) the breaker, (3) the insulation, inner liner, carcass and/or sidewall, and (4) the clinch, so that the static electricity generated in the tire can be discharged. In this case, an undertread and a jointless band may also be formed of highly conductive rubber components and used to form a conductive path between the components (1) and (2).

As for the components (3) in the above conductive path, it would be enough if at least one of these components is formed of a highly conductive rubber component. Of the components (3), the sidewall highly contributes to a reduction in heat build-up leading to a reduction in the rolling resistance of a tire, and the insulation is not required in every tire; therefore, these components are considered to be unsuitable as components for securing conductivity. The present inventors have eventually concluded that it is necessary to ensure good conductivity for a carcass.

Meanwhile, a known technique for giving conductivity to a rubber composition is to add a conductive carbon black such as ketjenblack EC300J (Mitsubishi Chemical Corporation). Conductive carbon blacks, however, are a material generally used as, for example, a coating material, a colorant, a toner, or an electrode material for a cell and are unfortunately too expensive to be used for tires.

In consideration of this issue, Lion Corporation started marketing an inexpensive conductive carbon black under the name of Lionite. However, the present inventors have revealed in their studies that a rubber for carcasses (a fiber cord topping rubber) containing this conductive carbon black has good conductivity, but has reduced adhesion to fiber cords, thereby reducing the tire durability.

CITATION LIST

Patent Literature

Patent Literature 1: JP 2013-49418 A

SUMMARY OF INVENTION

Technical Problem

The present invention aims to overcome the above drawbacks and provide: a rubber composition for a tire which provides both adhesion to fiber cords and conductivity even when an inexpensive conductive carbon black is used, and thus achieves a balanced improvement in conductivity, handling stability, fuel economy, elongation at break, adhesion to fiber cords, processability, and tire durability; and a pneumatic tire including the rubber composition.

Solution to Problem

The present inventors have made further intensive studies, and have found that a rubber with a large amount of fine powdered iron has reduced adhesion to fiber cords. They have also found that a decrease in the adhesion to fiber cords in the case of using an inexpensive conductive carbon black is due to the large amount of iron contained in the conductive carbon black. Moreover, as a result of further intensive studies, the present inventors have found that even in the case of using an inexpensive conductive carbon black, i.e., a conductive carbon black with a high iron content, it is possible to provide both adhesion to fiber cords and conductivity and suitably improve the properties mentioned above by adding a specific amount of a sulfur with a low iron content and setting the total net sulfur content to a specific range. Thus, the present invention has been completed.

More specifically, the present invention relates to a rubber composition for a tire including, per 100 parts by mass of a rubber component: 1.0 to 3.5 parts by mass of a sulfur with an iron content of 30 ppm or less, calculated as a net sulfur content in the sulfur; and 0.5 to 15 parts by mass of a conductive carbon black having a dibutyl phthalate oil absorption of 300 ml/100 g or more and an iron content of 60 ppm or more, wherein the rubber composition has a total net sulfur content of 1.0 to 6.0 parts by mass per 100 parts by mass of the rubber component, and has a volume resistivity of $1.0 \times 10^8$ Ω·cm or less.

In the rubber composition, preferably, the conductive carbon black used as a compounding agent has an iron content of 300 ppm or more, and the rubber composition has a volume resistivity of $1.0 \times 10^7$ Ω·cm or less.

In the rubber composition, the sulfur with an iron content of 30 ppm or less is preferably an insoluble sulfur with an iron content of 30 ppm or less.

The rubber composition preferably includes 1.6 to 8.0 parts by mass of zinc oxide per 100 parts by mass of the rubber component.

Preferably, the rubber composition has a total net sulfur content of 2.0 to 3.5 parts by mass per 100 parts by mass of the rubber component, and is for use as a rubber composition for a fiber cord topping.

The present invention also relates to a pneumatic tire, including a component including the rubber composition.

The component is preferably a rubberized fiber cord component.

The rubberized fiber cord component is preferably at least one of a carcass and a jointless band.

Advantageous Effects of Invention

The rubber composition for a tire of the present invention includes, per 100 parts by mass of a rubber component: 1.0 to 3.5 parts by mass of a sulfur with an iron content of 30 ppm or less, calculated as the net sulfur content in the sulfur; and 0.5 to 15 parts by mass of a conductive carbon black having a dibutyl phthalate oil absorption of 300 ml/100 g or more and an iron content of 60 ppm or more, wherein the rubber composition has a total net sulfur content of 1.0 to 6.0 parts by mass per 100 parts by mass of the rubber component, and has a volume resistivity of $1.0 \times 10^8$ Ω·cm or less. This rubber composition provides both adhesion to fiber cords and conductivity even though an inexpensive conductive carbon black, i.e., a conductive carbon black with a high iron content is used, and thus achieves a balanced improvement in conductivity, handling stability, fuel economy, elongation at break, adhesion to fiber cords, processability, and tire durability. Thus, the present invention provides a pneumatic tire exhibiting a balanced improvement in conductivity, handling stability, fuel economy, elongation at break, adhesion to fiber cords, and tire durability.

DESCRIPTION OF EMBODIMENTS

Figure 1:
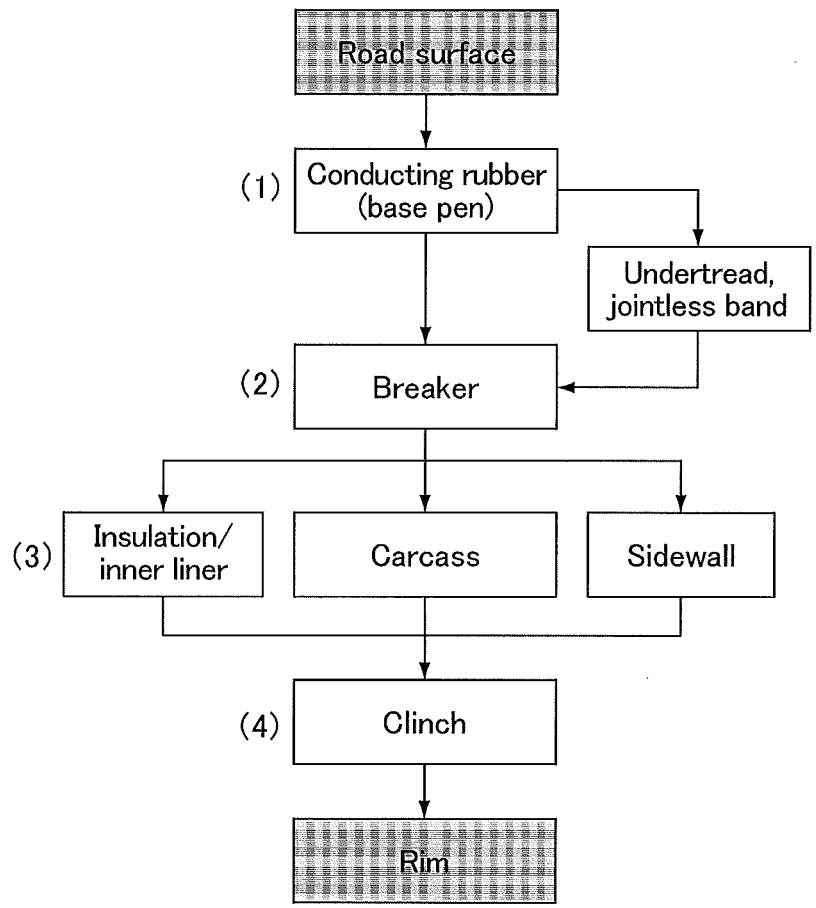
FIG. 1 is a schematic view illustrating a conductive path in a tire.

The rubber composition for a tire of the present invention includes, per 100 parts by mass of a rubber component: 1.0 to 3.5 parts by mass of a sulfur with an iron content of 30 ppm or less, calculated as the net sulfur content in the sulfur; and 0.5 to 15 parts by mass of a conductive carbon black having a dibutyl phthalate oil absorption of 300 ml/100 g or more and an iron content of 60 ppm or more, wherein the rubber composition has a total net sulfur content of 1.0 to 6.0 parts by mass per 100 parts by mass of the rubber component, and has a volume resistivity of $1.0 \times 10^8$ Ω·cm or less.

In the present invention, a specific amount of a conductive carbon black with a high iron content (a conductive carbon black having a dibutyl phthalate oil absorption of 300 ml/100 g or more and an iron content of 60 ppm or more) is used, while a specific amount of a sulfur with a low iron content is used. This formulation provides both adhesion to fiber cords and conductivity even though the conductive carbon black with a high iron content is used, and thus achieves a balanced improvement in conductivity, handling stability (E*), fuel economy, elongation at break (in the fresh state and after dry heat aging), adhesion to fiber cords (in the fresh state and after hygrothermal aging), processability (extrusion processability), and eventually tire durability. Together with the sulfur with a low iron content, a sulfur with an iron content exceeding the above iron content may also be used. In this case, when the combined content of these sulfurs, including the above sulfur with a low iron content, i.e., the total net sulfur content, is set to a specific amount, a pneumatic tire can be provided which exhibits a balanced improvement in conductivity, handling stability, fuel economy, elongation at break, adhesion to fiber cords, and eventually tire durability.

Adhering a fiber cord topping rubber to fiber cords is easy compared to adhering a steel cord topping rubber to steel cords. Especially fiber cords of nylon or aramid which contain an N—C=O group and are defined as polyamides in a broad sense have good adhesion reactivity to rubbers. Moreover, fiber cords of polyester (PE) are dipped in a dipping solution for promoting adhesion, which is formed from a material such as isocyanate, so that the reactivity on the fiber surface is improved. Even with the surface treatment, however, PEs have lower reactivity to rubbers than polyamides, and are therefore likely to undergo separation owing to a decrease in the adhesion resulting from, for example, heat build-up, distortion or oxidative degradation during driving, or migration of sulfur between the topping rubber and an adjacent component (especially a clinch rubber, breaker cushion rubber, or sidewall rubber).

In contrast, the present invention employing the structure defined above ensures good adhesion to fiber cords.

Examples of rubber materials that can be used in the rubber component in the present invention include diene rubbers such as isoprene-based rubbers, butadiene rubber (BR), styrene butadiene rubber (SBR), and styrene isoprene butadiene rubber (SIBR). These rubber materials may be used alone or in combination of two or more. For a balanced improvement in handling stability, fuel economy, elongation at break, adhesion to fiber cords, processability, and reversion resistance, isoprene-based rubbers and SBR are preferred among these, and combined use of an isoprene-based rubber and SBR is more preferred.

Examples of isoprene-based rubbers include isoprene rubber (IR), natural rubber (NR), and epoxidized natural rubber (ENR). NR is preferred among these because it is excellent in tire durability, adhesion to fiber cords, and the like. NR may be any one commonly used in the tire industry, such as SIR20, RSS#3, and TSR20. IR may be any one commonly used in the tire industry.

The isoprene-based rubber content based on 100% by mass of the rubber component is preferably 40% by mass or more, and more preferably 60% by mass or more. With an isoprene-based rubber content of less than 40% by mass, sufficient elongation at break, fuel economy, adhesion to fiber cords, processability, and eventually tire durability may not be achieved.

Conversely, the isoprene-based rubber content is preferably 90% by mass or less, and more preferably 80% by mass or less. With an isoprene-based rubber content of more than 90% by mass, sufficient handling stability and reversion resistance may not be achieved.

SBR may be any one commonly used in the tire industry, such as emulsion-polymerized styrene butadiene rubber (E-SBR) and solution-polymerized styrene butadiene rubber (S-SBR).

The SBR content based on 100% by mass of the rubber component is preferably 10% by mass or more, and more preferably 20% by mass or more. With an SBR content of less than 10% by mass, sufficient handling stability and reversion resistance may not be achieved.

Conversely, the SBR content is preferably 60% by mass or less, and more preferably 40% by mass or less. With an SBR content of more than 60% by mass, sufficient elongation at break, fuel economy, processability, and eventually tire durability may not be achieved.

The rubber composition of the present invention contains a sulfur with an iron content of 30 ppm or less. This contributes to providing both adhesion to fiber cords and conductivity even when a conductive carbon black with a high iron content is used, and thus achieving a balanced improvement in conductivity, handling stability (E*), fuel economy, elongation at break (in the fresh state and after dry heat aging), adhesion to fiber cords (in the fresh state and after hygrothermal aging), processability (extrusion processability), and eventually tire durability. Thus, the effect of the present invention can be suitably achieved.

The sulfur with an iron content of 30 ppm or less may be any sulfur having an iron content of 30 ppm or less, such as, for example, an insoluble sulfur or soluble sulfur. Specific examples of these sulfurs include powder sulfur, oil-treated sulfur, zinc oxide-treated sulfur, and other general sulfurs on which a treatment has been performed to prevent spreading. Insoluble sulfurs with an iron content of 30 ppm or less are preferred because then the effect of the present invention (especially good adhesion to fiber cords, good tire durability, and the unlikeliness of causing blooming of sulfur and a decrease in tackiness) can be suitably achieved.

The iron content in the sulfur is 30 ppm or less, preferably 25 ppm or less, and more preferably 20 ppm or less. With an iron content of more than 30 ppm, the effect of the present invention cannot be sufficiently achieved. The lower limit of the iron content is not particularly limited, and is preferably as low as possible.

Here, in the case that oil is contained along with sulfur (in the case of an oil-treated sulfur), the iron content in the sulfur refers to the iron element content based on the combined mass of sulfur and oil (i.e., the mass of the oil-treated sulfur).

The iron content in the sulfur can be measured by an inductively coupled plasma (ICP) optical emission spectrometer.

The amount of the sulfur with the above iron content, per 100 parts by mass of the rubber component, is 1.0 part by mass or more, preferably 1.5 parts by mass or more, more preferably 2.0 parts by mass or more, still more preferably 2.5 parts by mass or more, and particularly preferably 2.7 parts by mass or more. With less than 1.0 part by mass of the sulfur, the effect of the present invention is not sufficiently achieved. The amount of the sulfur is 3.5 parts by mass or less, preferably 3.3 parts by mass or less. With more than 3.5 parts by mass of the sulfur, the elongation at break especially after dry heat aging, and eventually the tire durability will be reduced.

Here, the amount of the sulfur refers to the net sulfur content in the sulfur; in the case of using an oil-treated sulfur, it refers to the net sulfur content in the oil-treated sulfur (i.e., the amount excluding the oil contained in the oil-treated sulfur).

As mentioned above, the sulfur with a low iron content may be used in combination with a sulfur with an iron content exceeding the former iron content. In this case (and, of course, in the case where the sulfur with a low iron content is used alone), the total sulfur content is required to satisfy the amount defined below.

The total sulfur content per 100 parts by mass of the rubber component is 1.0 part by mass or more, preferably 1.5 parts by mass or more, more preferably 2.0 parts by mass or more, still more preferably 2.5 parts by mass or more, and particularly preferably 2.8 parts by mass or more. With a total sulfur content of less than 1.0 part by mass, the handling stability, fuel economy, adhesion to fiber cords, and eventually tire durability will be reduced. Also, the total sulfur content is 6.0 parts by mass or less, preferably 5.0 parts by mass or less, more preferably 4.0 parts by mass or less, still more preferably 3.5 parts by mass or less, and particularly preferably 3.3 parts by mass or less. With a total sulfur content of more than 6.0 parts by mass, sulfur tends to bloom, causing a decrease in fuel economy, and elongation at break especially after dry heat aging, and eventually in tire durability.

Here, the total sulfur content refers to the total net sulfur content in the sulfur(s) including the sulfur with a low iron content. Here, the net sulfur content refers to, in the case of using an oil-treated sulfur, for instance, the net sulfur content in the oil-treated sulfur (i.e., the amount excluding the oil contained in the oil-treated sulfur).

The total iron element content derived from sulfur(s) per 100 parts by mass of the rubber component is preferably 6 ppm or less, more preferably 4 ppm or less, and still more preferably 1 ppm or less. With a total iron element content of more than 6 ppm, the adhesion to fiber cords, and eventually the tire durability tend to decrease. The lower limit of the total iron element content is not particularly limited, and is preferably as low as possible.

The rubber composition of the present invention preferably contains zinc oxide. This improves the adhesion to fiber cords, handling stability, fuel economy, elongation at break, and reversion resistance. Also, the zinc oxide in the kneaded compound (during kneading) temporarily adsorbs sulfur to serve as a storage for the sulfur, and thus can reduce the blooming of sulfur, suppressing a decrease in the adhesion to fiber cords caused by the blooming of sulfur, and eventually a decrease in tire durability.

The zinc oxide may be a conventional one used in the rubber industry, and specific examples include zinc oxides #1 and #2 from MITSUI MINING & SMELTING CO., LTD.

The amount of zinc oxide per 100 parts by mass of the rubber component is preferably 1.0 part by mass or more, more preferably 1.6 parts by mass or more, still more preferably 2.0 parts by mass or more, particularly preferably 2.2 parts by mass or more, further more preferably 2.5 parts by mass or more, and most preferably 2.7 parts by mass or more. With less than 1.0 part by mass of zinc oxide, sulfur tends to bloom, decreasing the handling stability, fuel economy, elongation at break, adhesion to fiber cords, and reversion resistance, and eventually the tire durability. The amount of zinc oxide is preferably 16.0 parts by mass or less, more preferably 12.0 parts by mass or less, still more preferably 8.0 parts by mass or less, particularly preferably 6.0 parts by mass or less, further more preferably 5.0 parts by mass or less, even more preferably 4.0 parts by mass or less, and most preferably 3.5 parts by mass or less. With more than 16.0 parts by mass of zinc oxide, there is likely to be an adverse effect on the environment and cost.

The ratio of the amount of zinc oxide to the total net sulfur content is preferably 0.50 or higher, more preferably 0.70 or higher, still more preferably 0.80 or higher, and particularly preferably 0.90 or higher. With a ratio lower than 0.50, sulfur may tend to bloom, decreasing the processability (extrusion processability), adhesion to fiber cords (especially after hygrothermal aging), and elongation at break (especially after dry heat aging), and eventually the tire durability.

The ratio is preferably 4.00 or lower, more preferably 3.00 or lower, still more preferably 2.00 or lower, particularly preferably 1.70 or lower, and most preferably 1.50 or lower. With a ratio higher than 4.00, sulfur can be more suitably prevented from blooming, which is an advantage; however, if undispersed aggregates of zinc oxide are formed, they may act as fracture nuclei under tension, decreasing the elongation at break. Additionally, such a large amount of zinc oxide, which has a high price and a high specific gravity, may lead to an increased cost and an increased weight (deteriorated fuel economy) of the tire.

Furthermore, when the ratio defined above is satisfied, zinc oxide can be prevented from acting as fracture nuclei, and thus good elongation at break and eventually good tire durability can be achieved.

In the present invention, a specific amount of an insoluble sulfur with a low iron content is used while setting the total net sulfur content (and preferably the amount of zinc oxide) to a specific range(s). With this formulation, good adhesion to fiber cords is ensured even when the amount of crosslinkable resin is reduced or eliminated, and therefore a pneumatic tire is provided which exhibits a balanced improvement in handling stability, fuel economy, elongation at break, adhesion to fiber cords, and eventually tire durability. Additionally, since the amount of crosslinkable resin used can be reduced, the pneumatic tire is cost-effective and friendly to the environment.

Examples of crosslinkable resins include, but not limited to, those commonly used in the tire industry, such as resorcinol resins, phenol resins, and alkylphenol resins. The crosslinkable resin may be formed from multiple kinds of monomers, and may be chain-end modified.

Examples of resorcinol resins include resorcinol formaldehyde condensates. Specific examples thereof include Resorcinol from Sumitomo Chemical Co., Ltd. The resorcinol resin may be a modified resorcinol resin obtained by modification. Examples of modified resorcinol resins include those obtained by alkylating part of the repeating units of a resorcinol resin. Specific examples thereof include Penacolite resins B-18-S and B-20 from INDSPEC Chemical Corporation, SUMIKANOL 620 from Taoka Chemical Co., Ltd., R-6 from Uniroyal, SRF1501 from Schenectady Chemicals, Inc., and Arofene 7209 from Ashland Inc.

Examples of phenol resins include those obtained by reacting phenol and an aldehyde such as formaldehyde, acetaldehyde or furfural in the presence of an acid or alkali catalyst, and also include modified phenol resins which have been modified using a compound such as cashew oil, tall oil, linseed oil, and various other animal or vegetable oils, unsaturated fatty acids, rosin, alkylbenzene resins, aniline, and melamine.

Examples of alkylphenol resins include those obtained by reacting an alkylphenol and an aldehyde mentioned above in the presence of an acid or alkali catalyst, and also include modified alkylphenol resins which have been modified using a compound (e.g. cashew oil) as mentioned above. Specific examples of alkylphenol resins include cresol resin and octylphenol resin.

The amount of crosslinkable resin (preferably the combined amount of resorcinol resin, phenol resin, and alkylphenol resin) per 100 parts by mass of the rubber component is preferably 2.5 parts by mass or less, more preferably 1.5 parts by mass or less, still more preferably 0.5 parts by mass or less, particularly preferably 0.1 parts by mass or less, and most preferably 0 parts by mass (i.e. substantially no crosslinkable resin is contained).

Since the rubber composition of the present invention allows a reduction in the amount of crosslinkable resin added, as mentioned above, the amount of methylene donor, i.e., a partial condensate of hexamethoxymethylolmelamine (HMMM) or a partial condensate of hexamethylol melamine pentamethyl ether (HMMPME) to be added can also be reduced.

The combined amount of the partial condensate of HMMM and the partial condensate of HMMPME per 100 parts by mass of the rubber component is preferably 3.0 parts by mass or less, more preferably 1.5 parts by mass or less, still more preferably 0.5 parts by mass or less, particularly preferably 0.1 parts by mass or less, and most preferably 0 parts by mass (i.e. they are substantially not contained).

The rubber composition of the present invention contains a conductive carbon black having a dibutyl phthalate oil absorption of 300 ml/100 g or more and an iron content of 60 ppm or more. This provides good conductivity and thus contributes to achieving the effect of the present invention well.

Any conductive carbon black may be used as long as it satisfies the properties defined above. Examples thereof include Lionite from Lion Corporation and ketjenblack EC600JD from Lion Corporation.

The iron content in the conductive carbon black is 60 ppm or more, preferably 200 ppm or more, more preferably 300 ppm or more, still more preferably 500 ppm or more, particularly preferably 800 ppm or more, and most preferably 1000 ppm or more. With an iron content of less than 60 ppm, the conductive carbon black has an increased cost and is thus difficult to use for tire rubbers. The iron content is preferably 3000 ppm or less, more preferably 2500 ppm or less, still more preferably 2000 ppm or less, and particularly preferably 1500 ppm or less. With an iron content of more than 3000 ppm, the rubber composition may have a very high iron content, and therefore exhibit reduced adhesion to fiber cords and eventually cause reduced tire durability.

The iron content in carbon black (conductive carbon black) herein can be measured by an inductively coupled plasma (ICP) optical emission spectrometer.

The dibutyl phthalate oil absorption (DBP) of the conductive carbon black is 300 ml/100 g or more, preferably 320 ml/100 g or more, and more preferably 340 ml/100 g or more. With a DBP of less than 300 ml/100 g, sufficient conductivity cannot be provided. The DBP of the conductive carbon black is preferably 600 ml/100 g or less, more preferably 500 ml/100 g or less, and still more preferably 400 ml/100 g or less. With a DBP of more than 600 ml/100 g, the dispersibility of the conductive carbon black, processability, and fuel economy may be reduced.

The nitrogen adsorption specific surface area ($N_2SA$) of the conductive carbon black is preferably 700 $m^2/g$ or more, more preferably 800 $m^2/g$ or more, still more preferably 900 $m^2/g$ or more, and particularly preferably 1000 $m^2/g$ or more. With an $N_2SA$ of less than 700 $m^2/g$, sufficient conductivity may not be provided. The $N_2SA$ is preferably 1500 $m^2/g$ or less, more preferably 1300 $m^2/g$ or less, still more preferably 1200 $m^2/g$ or less, and particularly preferably 1100 $m^2/g$ or less. With an $N_2SA$ of more than 1500 $m^2/g$, dispersibility of the conductive carbon black, processability, and fuel economy may not sufficiently be obtained.

The amount of the conductive carbon black per 100 parts by mass of the rubber component is 0.5 parts by mass or more, preferably 0.8 parts by mass or more, more preferably 1.2 parts by mass or more, and still more preferably 1.5 parts by mass or more. With less than 0.5 parts by mass of the conductive carbon black, sufficient conductivity cannot be provided. The amount of the conductive carbon black is 15 parts by mass or less, preferably 12 parts by mass or less, more preferably 8 parts by mass or less, still more preferably 5 parts by mass or less, and particularly preferably 3 parts by mass or less. With more than 15 parts by mass of the conductive carbon black, the fuel economy, elongation at break, and adhesion to fiber cords, and eventually the tire durability will be reduced.

Figure 2:
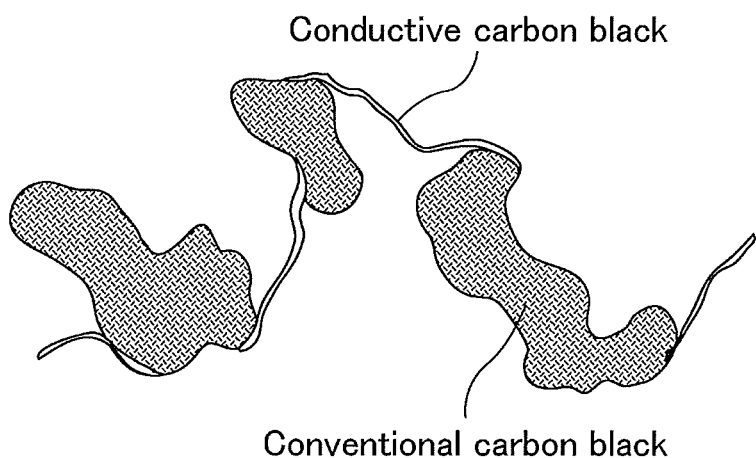
FIG. 2 is a schematic view illustrating examples of forms of a conductive carbon black and of a conventional carbon black present in a rubber composition.

The rubber composition of the present invention preferably contains the conductive carbon black together with a carbon black other than the conductive carbon black (i.e., a conventional carbon black). This provides good reinforcement and synergistically improves the balance of the aforementioned properties. Accordingly, the effect of the present invention can be well achieved. Also, the use of a conventional carbon black together with the conductive carbon black suitably provides conductivity even when the amount of the conductive carbon black used is small. This is probably because the long linked conductive carbon black bridges aggregates of the conventional carbon black (see FIG. 2).

The nitrogen adsorption specific surface area ($N_2SA$) of the conventional carbon black is preferably 25 $m^2/g$ or more, and more preferably 60 $m^2/g$ or more. With an $N_2SA$ of less than 25 $m^2/g$, sufficient elongation at break and sufficient handling stability may not be achieved. The $N_2SA$ is preferably 120 $m^2/g$ or less, and more preferably 100 $m^2/g$ or less. With an $N_2SA$ of more than 120 $m^2/g$, sufficient fuel economy may not be achieved.

The $N_2SA$ of conductive carbon blacks and conventional carbon blacks herein is determined in accordance with JIS K 6217-2:2001.

The dibutyl phthalate oil absorption (DBP) of the conventional carbon black is preferably 50 ml/100 g or more, and more preferably 85 ml/100 g or more. With a DBP of less than 50 ml/100 g, sufficient reinforcement and sufficient conductivity may not be obtained. The DBP of the conventional carbon black is also preferably 200 ml/100 g or less, and more preferably 135 ml/100 g or less. With a DBP of more than 200 ml/100 g, the processability may be reduced.

The DBP of conductive carbon blacks and conventional carbon blacks herein is measured in accordance with JIS K6217-4:2001.

The amount of conventional carbon black per 100 parts by mass of the rubber component is preferably 5 parts by mass or more, more preferably 10 parts by mass or more, still more preferably 20 parts by mass or more, and particularly preferably 30 parts by mass or more. The amount of conventional carbon black is also preferably 70 parts by mass or less, more preferably 60 parts by mass or less, and still more preferably 50 parts by mass or less. If the conventional carbon black is used within the range mentioned above, the aforementioned properties (especially fuel economy and durability) can be well achieved. The use of the conventional carbon black within the range mentioned above also ensures good conductivity even when the amount of the conductive carbon black is 5 parts by mass or less (preferably 3 parts by mass or less), as well as contributing to achieving the aforementioned properties well.

The total iron element content derived from the conductive carbon black and the conventional carbon black, per 100 parts by mass of the rubber component, is preferably 150 ppm or less, more preferably 130 ppm or less, and still more preferably 110 ppm or less. With a total iron element content of more than 150 ppm, the adhesion to fiber cords and eventually the tire durability tend to decrease. The lower limit of the total iron element content is not particularly limited.

The rubber composition of the present invention preferably contains silica. This provides good reinforcement; moreover, the silica adsorbs sulfur such that blooming of sulfur can be suitably prevented, and synergistically improves the balance of the aforementioned properties (especially fuel economy, elongation at break, adhesion to fiber cords, and processability). Therefore, the effect of the present invention can be more suitably achieved.

Examples of silica include, but not limited to, dry silica (silica anhydride) and wet silica (hydrous silica). Wet silica is preferred for the reason that it has a large number of silanol groups.

The nitrogen adsorption specific surface area ($N_2SA$) of silica is preferably 100 m$^2$/g or more, and more preferably 110 m$^2$/g or more. With an $N_2SA$ of less than 100 m$^2$/g, the elongation at break tends to decrease. The $N_2SA$ of silica is preferably 250 m$^2$/g or less, and more preferably 230 m$^2$/g or less. With an $N_2SA$ of more than 250 m$^2$/g, the fuel economy and processability tend to decrease.

Here, the $N_2SA$ of silica is determined by the BET method in accordance with ASTM D3037-93.

The amount of silica per 100 parts by mass of the rubber component is preferably 3 parts by mass or more. With less than 3 parts by mass of silica, a sufficient improvement in elongation at break may not be achieved. Also, the amount of silica is preferably 50 parts by mass or less, more preferably 30 parts by mass or less, and still more preferably 20 parts by mass or less. More than 50 parts by mass of silica may lead to reduced handling stability and reduced processability, such as shrinkage of the calendered fabric.

The carbon black content based on 100% by mass of the combined amount of silica and carbon black is preferably 30% by mass or more, more preferably 35% by mass or more, and still more preferably 40% by mass or more. The upper limit of the carbon black content is not particularly limited, and is preferably 95% by mass or less although it may be 100% by mass. With a carbon black content within the range mentioned above, a rubber composition exhibiting an excellent balance of the aforementioned properties is obtained.

In the rubber composition of the present invention, the amount of softener per 100 parts by mass of the rubber component is preferably 20 parts by mass or less, more preferably 15 parts by mass or less, and still more preferably 12 parts by mass or less. With more than 20 parts by mass of softener, the oil is likely to cover fiber cords, deteriorating the adhesion of the rubber to the fiber cords. Moreover, the handling stability may be reduced. Furthermore, the excessive amount of softener may induce blooming of sulfur. Although the lower limit of the amount of softener is not particularly limited, the lower limit is preferably 1 part by mass or more, and more preferably 5 parts by mass or more, in terms of processability.

In the present invention, the softener refers to any of process oils, C5 petroleum resins, and C9 petroleum resins. Here, the crosslinkable resins (resorcinol resins, phenol resins, alkylphenol resins) mentioned above are not included in the softener in the present invention.

The process oil refers to a petroleum oil that is added in addition to other components including the rubber component in order to improve the processability of a rubber compound (e.g. softening effect, effect of dispersing components, lubricating effect). The process oil does not include oils which are previously added to other components such as HMMPME, insoluble sulfur, and oil-extended rubbers. Examples of process oils include paraffinic oils, naphthenic oils, and aromatic oils.

Examples of C5 petroleum resins include aliphatic petroleum resins made mainly from olefins and diolefins in C5 fraction obtained by naphtha cracking. Examples of C9 petroleum resins include aromatic petroleum resins made mainly from vinyltoluene, indene and methylindene in C9 fraction obtained by naphtha cracking.

The C5 and C9 petroleum resins each preferably have a softening point of –20° C. or higher, more preferably 50° C. or higher, and still more preferably 80° C. or higher. The softening point is preferably 150° C. or lower, and more preferably 130° C. or lower. With a softening point within the range mentioned above, the aforementioned properties can be well achieved.

Preferred among the C9 petroleum resins are coumarone-indene resins. The addition of a coumarone-indene resin provides good adhesion to fiber cords, good elongation at break, and eventually good tire durability, and thus synergistically improves the balance of the aforementioned properties. In particular, coumarone-indene resins (liquid coumarone-indene resins) having a softening point in the range described below also provide good fuel economy. This is presumably because a moderate polarity and a moderate mobility of the coumarone-indene resin promote the dispersion of sulfur and vulcanization accelerators, and consequently promote uniform formation of sulfur crosslinks. Additionally, the coumarone-indene resin causes no blooming of sulfur, and also functions as a surface tension reducing agent that improves the compatibility between fiber cords and the topping rubber.

The coumarone-indene resin preferably has a softening point of –20° C. or higher, more preferably 0° C. or higher. The softening point is preferably 60° C. or lower, more preferably 35° C. or lower, and still more preferably 15° C. or lower. With a softening point within the range mentioned above, the aforementioned properties can be well achieved.

The softening point of coumarone-indene resins, which is measured as set forth in JIS K 6220-1:2001 with a ring and ball softening point measuring apparatus, refers to the temperature at which the ball drops down.

The amount of coumarone-indene resin per 100 parts by mass of the rubber component is preferably 0.5 parts by mass or more, and more preferably 3 parts by mass or more. Also, the amount of coumarone-indene resin is preferably 15 parts by mass or less, and more preferably 12 parts by mass or less. If the coumarone-indene resin is used within the range mentioned above, the effect of the present invention can be well achieved.

The rubber composition of the present invention preferably contains an antioxidant. This suppresses oxygen- or ozone-induced polymer degradation on the surface of the calendered fabric (topping rubber) before building and assembly. This hence suppresses a decrease in the crosslink density of the compound on the surface of the calendered fabric, thus preventing blooming of sulfur.

The antioxidant is not particularly limited, and is preferably a quinolinic antioxidant because quinolinic antioxidants have a small amount of amine which induces blooming of sulfur. The present inventors have also studied and found that the primary amine (i.e., unreacted monomer) contained in a quinolinic antioxidant particularly induces blooming of sulfur and thus decreases the adhesion to fiber cords, and processability, and eventually the tire durability. Hence, the primary amine content based on 100% by mass of the quinolinic antioxidant is preferably 0.7% by mass or less, and more preferably 0.65% by mass or less. The lower limit of the primary amine content is not particularly limited, and is preferably 0.2% by mass or more in terms of productivity during production.

The primary amine content in an antioxidant can be measured by the following method.

A p-dimethylamino benzaldehyde (DAB) solution (10 g/L) is mixed with each of aniline solutions having different concentrations. After 30 minutes or longer, the absorbance of each mixed solution is measured at 440 nm. At this time, the absorbances are calibrated based on the absorbance of a reagent blank. Then, the determined absorbances (calibrated absorbances) are plotted against the aniline concentrations to form a standard curve.

Next, an antioxidant (0.20 g) is mixed with chloroform (50 mL) and 7% hydrochloric acid (50 mL). The mixture is shaken for about 10 minutes and allowed to stand still for about 1 hour. Subsequently, the upper layer (7% hydrochloric acid) of the mixture is separated and the separated solution is mixed with a DAB solution. After 30 minutes or longer, the absorbance of the resulting mixture is measured at 440 nm. At this time, the absorbance is calibrated based on the absorbance of a reagent blank. Then, the primary amine content is calculated from this calibrated absorbance and the standard curve.

The amount of antioxidant (preferably, quinolinic antioxidant) per 100 parts by mass of the rubber component is preferably 0.5 parts by mass or more, and more preferably 0.7 parts by mass or more. Also, the amount of antioxidant is preferably 3.0 parts by mass or less, and more preferably 2.0 parts by mass or less. If the antioxidant is used within the range mentioned above, the effect of the present invention can be well achieved.

The rubber composition of the present invention preferably contains a vulcanization accelerator. Examples of vulcanization accelerators include guanidine compounds, aldehyde-amine compounds, aldehyde-ammonia compounds, thiazole compounds, sulfenamide compounds, thiourea compounds, thiuram compounds, dithiocarbamate compounds, and xanthate compounds. These vulcanization accelerators may be used alone or in combination of two or more. Among these, sulfenamide vulcanization accelerators (such as N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and N,N-diisopropyl-2-benzothiazole sulfenamide (TBSI)) are preferred because they provide good adhesion to fiber cords. More preferred are TBBS and CBS.

The amount of vulcanization accelerator per 100 parts by mass of the rubber component is preferably 0.3 parts by mass or more, more preferably 0.5 parts by mass or more, and still more preferably 0.8 parts by mass or more. With less than 0.3 parts by mass of vulcanization accelerator, the handling stability and adhesion to fiber cords may be insufficient. The amount of vulcanization accelerator is preferably 4 parts by mass or less, more preferably 3 parts by mass or less, still more preferably 2 parts by mass or less, and particularly preferably 1.5 parts by mass or less. With more than 4 parts by mass of vulcanization accelerator, the adhesion to fiber cords (particularly after hygrothermal aging) and the elongation at break tend to decrease.

The rubber composition of the present invention may appropriately contain, in addition to the components mentioned above, compounding agents commonly used in the tire industry, such as a silane coupling agent, stearic acid, and cobalt stearate.

The rubber composition of the present invention can be prepared by a known method such as those including kneading the components using a rubber kneader such as an open roll mill or Banbury mixer, followed by vulcanization.

The (vulcanized) rubber composition of the present invention has a volume resistivity of $1.0 \times 10^8$ $\Omega \cdot cm$ or less, and preferably $1.0 \times 10^7$ $\Omega \cdot cm$ or less. With a volume resistivity of more than $1.0 \times 10^8$ $\Omega \cdot cm$, the electrical resistance of the tire is increased enough to cause accumulation of static electricity in a vehicle, leading to the phenomenon of static electricity discharge which can cause various problems. With a volume resistivity of $1.0 \times 10^8$ $\Omega \cdot cm$ or less, on the other hand, the conductivity of the tire is increased. The lower limit of the volume resistivity is not particularly limited, and is preferably $1 \times 10^3$ $\Omega \cdot cm$ or more, and more preferably $1 \times 10^4$ $\Omega \cdot cm$ or more.

The volume resistivity herein refers to a volume resistance measured at an applied voltage of 1000 V under constant temperature and humidity conditions (temperature: 23° C., relative humidity: 55%) with other conditions as specified in JIS K 6271:2008. Unless otherwise indicated, the term "volume resistivity" as employed herein alone refers to a volume resistivity measured by the above method.

The rubber composition of the present invention can be used as a rubber composition for a fiber cord topping (rubber composition for a topping) which coats fiber cords. In particular, the rubber composition can be suitably used as a rubber composition for a carcass topping or a rubber composition for a jointless band topping.

Examples of fiber cords include cords formed from fibers such as polyethylene, nylon, aramid, glass fiber, polyester, rayon, and polyethylene terephthalate. Hybrid cords formed from a plurality of different fibers may also be used. Examples of hybrid cords include hybrid nylon/aramid cords.

The rubber composition of the present invention coats fiber cords to form a rubberized fiber cord component. Specifically, the rubber composition for a carcass topping and the rubber composition for a jointless band topping coat fiber cords to form a carcass and a jointless band, respectively.

A carcass generally includes polyester cords, whereas a jointless band generally includes nylon cords. The jointless band may include aramid cords or hybrid nylon/aramid cords.

The term "carcass" refers to a component formed from fiber cords and a fiber cord topping rubber layer. Specifically, it is a component as shown in FIG. 1 of JP 2008-75066 A (which is incorporated by reference in the entirety), for example.

Figure 3:
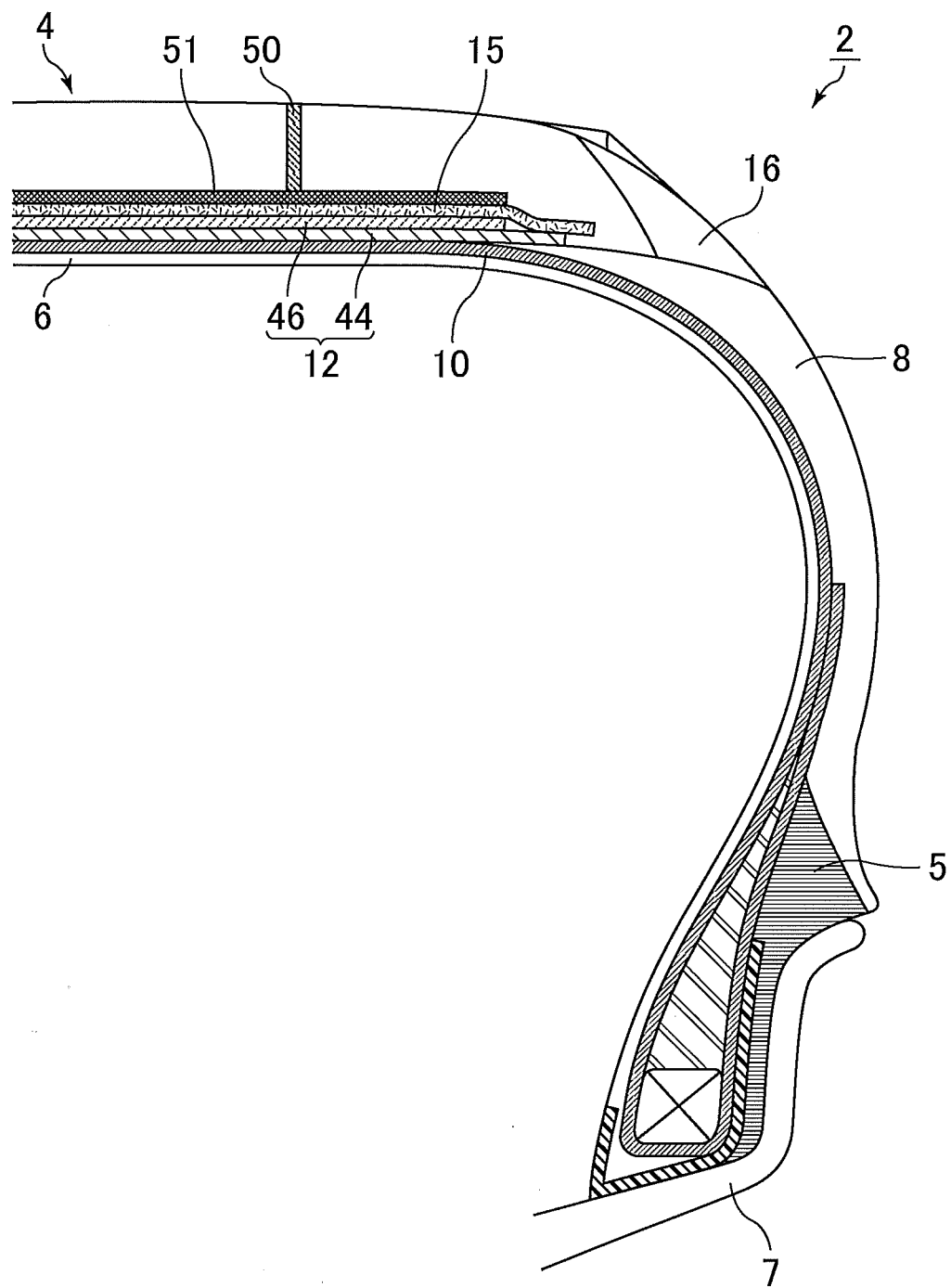
FIG. 3 is a cross-sectional view illustrating a part of a pneumatic tire according to an embodiment of the present invention.

The term "jointless band" refers to a component formed from fiber cords and a fiber cord topping rubber layer. It is disposed outwardly from a breaker in the radial direction of the tire in order to prevent separation of the breaker from the carcass due to the centrifugal force of the tire during driving of the vehicle. Specifically, it is a component as shown in FIG. 3 of JP 2009-007437 A (which is incorporated by reference in the entirety), for example.

Since the topping rubber forms a very thin rubber coating on fiber cords, tire components present around the rubberized fiber cord component preferably have good adhesion to fiber cords. Thus, the rubber composition of the present invention exhibits good adhesion after vulcanization to rubber compositions for a tread, a sidewall, an inner sidewall layer, a tie gum, and a breaker, which are present around the rubberized fiber cord component.

The "inner sidewall layer" refers to the inner layer portion of a sidewall having a multilayer structure. Specifically, it is a component as shown in FIG. 1 of JP 2007-106166 A (which is incorporated by reference in the entirety), for example.

The "tie gum" refers to a component disposed inwardly from the carcass in the radial direction of the tire and outwardly from the inner liner in the radial direction of the tire. Specifically, it is a component as illustrated in FIG. 1 of JP 2010-095705 A (which is incorporated by reference in the entirety), for example.

The "breaker" refers to a component disposed outwardly from the carcass in the radial direction of the tire. Specifically, it is a component as illustrated in FIG. 3 of JP 2003-94918 A, FIG. 1 of JP 2006-273934 A, and FIG. 1 of JP 2004-161862 A (which are incorporated by reference in their entirety).

The pneumatic tire of the present invention can be produced by a conventional method using the above rubber composition.

Specifically, an unvulcanized rubber composition containing the components is made into a sheet. The sheet is compressed onto the upper and lower surfaces of fiber cords, and rolled to form a fabric with cords (rubberized fiber cord component (the total thickness of rubberized cords is about 0.70 to 2.00 mm, with the kind of cord, the endcount, and the amount of rubber depending on the application)). The fabric is assembled with other tire components in a usual manner in a tire building machine to build an unvulcanized tire. This unvulcanized tire is then heat-pressed in a vulcanizer to give a tire. The rubberized fiber cord component is preferably a carcass and/or a jointless band.

The pneumatic tire of the present invention can be suitably used as a tire for passenger cars, a tire for light trucks, or a tire for motorcycles.

A cross-sectional view of a part of a pneumatic tire of an embodiment of the present invention is shown in FIG. 3. As illustrated in FIG. 3, a pneumatic tire 2 has a conductive path formed from the road surface to a rim 7 through a conducting rubber 50 embedded in a tread 4 so that it comes into contact with the road surface, an undertread 51, a jointless band 15, a breaker 12, a carcass 10, and a clinch 5, whereby the static electricity generated in the tire can be discharged.

EXAMPLES

Hereinafter, the present invention will be described in more detail with reference to the examples which, however, are not intended to limit the scope of the present invention.

Various chemical agents used in examples and comparative examples are listed below.

<NR>: TSR20

<SBR>: SBR1502 (styrene content: 23.5% by mass) from Sumitomo Chemical Co., Ltd.

<Silica>: ULTRASIL VN3 ($N_2SA$: 175 $m^2/g$) from Degussa

<Carbon black 1>: DIABLACK N326 ($N_2SA$: 84 $m^2/g$, DBP: 74 ml/100 g, iron content: 2 ppm) from Mitsubishi Chemical Corporation <Carbon black 2>: DIABLACK N330 ($N_2SA$: 78 $m^2/g$, DBP: 102 ml/100 g, iron content: 2 ppm) from Mitsubishi Chemical Corporation <Conductive carbon black 1>: purified product of Lionite (purified product obtained by removing iron elements from a Lionite from Lion Corporation by adsorption using an electromagnet; $N_2SA$: 1052 $m^2/g$, DBP: 378 ml/100 g, iron content: 300 ppm) from Lion Corporation <Conductive carbon black 2>: Lionite (inexpensive conductive carbon black (sold at a price that is about 60% of that of widely used conductive carbon blacks), $N_2SA$: 1052 $m^2/g$, DBP: 378 ml/100 g, iron content: 1330 ppm) from Lion Corporation <Silane coupling agent>: Si75 (bis(3-triethoxysilylpropyl) disulfide) from Degussa <Antioxidant 1>: purified product of Nocrac 224 (trial product (quinolinic antioxidant), primary amine content: 0.6% by mass) from Ouchi Shinko Chemical Industrial Co., Ltd.

<Antioxidant 2>: Nocrac 224 (2,2,4-trimethyl-1,2-dihydroquinoline polymer (quinolinic antioxidant), primary amine content: 26.4% by mass) from Ouchi Shinko Chemical Industrial Co., Ltd.

<C5 petroleum resin>: Marukarez T-100AS (C5 petroleum resin: aliphatic petroleum resin mainly formed from olefins and diolefins in C5 fraction obtained by naphtha cracking; softening point: 100° C.) from Maruzen Petrochemical Co., Ltd.

<TDAE oil>: vivatec 500 (aromatic oil) from H&R

<Liquid coumarone-indene resin>: NOVARES C10 (coumarone-indene resin, softening point: 5° C. to 15° C.) from Rutgers Chemicals <Zinc oxide>: zinc oxide #2 from Mitsui Mining & Smelting Co., Ltd.

<Cobalt stearate>: cost F (cobalt content: 9.5% by weight) from DIC Corporation

<Stearic acid>: Tsubaki from NOF Corporation

<Insoluble sulfur A>: improved product of Crystex HS OT 20 (trial product, insoluble sulfur containing 80% by mass of sulfur and 20% by mass of oil; iron content: 15 ppm) from Flexsys <Insoluble sulfur B>: IS-HS-7520 (insoluble sulfur containing 80% by mass of sulfur and 20% by mass of oil; iron content: 50 ppm) from Shanghai Jinghai Chemical (China)

<Insoluble sulfur C>: IS-HS-7520 (different lot of insoluble sulfur B, insoluble sulfur containing 80% by mass of sulfur and 20% by mass of oil; iron content: 200 ppm) from Shanghai Jinghai Chemical (China)

<Powder sulfur>: 5% oil-containing powder sulfur (soluble sulfur containing 95% by mass of sulfur and 5% by mass of oil; iron content: 20 ppm) from Hosoi Chemical Industry Co., Ltd.

<Vulcanization accelerator 1 (CBS)>: Nocceler CZ (N-cyclohexyl-2-benzothiazolylsulfenamide) from Ouchi Shinko Chemical Industrial Co., Ltd.

<Vulcanization accelerator 2 (DCBS)>: Nocceler DZ (N,N-dicyclohexyl-2-benzothiazolylsulfenamide) from Ouchi Shinko Chemical Industrial Co., Ltd.

<HMMPME>: Sumikanol 507A (modified etherified methylol melamine resin (partial condensate of hexamethylol melamine pentamethyl ether (HMMPME)); active ingredient content: 65% by mass, silica: 32% by mass, paraffinic oil: 3% by mass) from Sumitomo Chemical Co., Ltd.

<Modified resorcinol resin>: Sumikanol 620 (modified resorcinol condensate resin) from Taoka Chemical Co., Ltd.

In accordance with each of the formulations shown in Tables 1 and 2 (regarding the amount of sulfur, values in the parenthesis represent net sulfur contents), chemical agents other than the sulfur and vulcanization accelerator were kneaded in a 1.7-L Banbury mixer for 5 minutes with a discharge temperature of 150° C. to give a kneaded mixture. Thereafter, the sulfur and vulcanization accelerator were added to the kneaded mixture and they were kneaded using a roll mill for four minutes with a maximum rubber temperature of 105° C., whereby an unvulcanized rubber composition was prepared. The unvulcanized rubber composition was press-vulcanized at 170° C. for 12 minutes to prepare a vulcanized rubber composition.

Separately, a carcass and a jointless band were formed by coating fiber cords with the unvulcanized rubber composition. The carcass and the jointless band were assembled with other tire components into an unvulcanized tire. The unvulcanized tire was press-vulcanized at 170° C. for 12 minutes to prepare a test tire for commercial trucks (tire size: 225/70R16 117/115).

Separately, the unvulcanized rubber composition was also formed into a rubber sheet (thickness: 0.38 mm). Then, the upper and lower surfaces of fiber cords (polyester cords (raw materials: terephthalic acid and ethylene glycol) available from TEIJIN LIMITED; 1670 dtex/2; cord diameter: 0.66 mm) were topped with the rubber sheet. The rubberized fiber cords were press-vulcanized at 180° C. for 40 minutes to prepare a sample for a peel test.

The vulcanized rubber compositions and samples for a peel test thus obtained were subjected to hygrothermal aging at a temperature of 80° C. and a relative humidity of 95% for 150 hours to prepare hygrothermally aged products.

Separately, the vulcanized rubber compositions were also subjected to dry heat aging (air oxidative degradation) in a dry oven at a temperature of 80° C. for 96 hours to prepare dry heat aged products.

The unvulcanized rubber compositions, the vulcanized rubber compositions (fresh products, hygrothermally aged products, and dry heat aged products), the samples for a peel test (fresh samples and hygrothermally aged samples), and the test tires for commercial trucks were evaluated as described below. Tables 1 and 2 show the results.

<Volume Resistivity of Rubber Composition>

Test pieces (2 mm (thickness)×15 cm×15 cm) were prepared from the vulcanized rubber compositions (fresh products), and the volume resistivity of each rubber composition was measured using R8340A as an instrument for measuring the electrical resistance (from ADVANTEST CORPORATION) at an applied voltage of 1000 V under constant temperature and humidity conditions (temperature: 23° C., relative humidity: 55%) with other conditions as specified in JIS K 6271:2008. A smaller value indicates a lower volume resistivity of the rubber composition, showing that the conductivity is good.

(Tire Durability (Heavy Load Durability Drum Test))

The test tire for commercial trucks at 230% of the maximum load (maximum internal pressure) as specified in JIS was run on a drum at a speed of 20 km/h. The running distance until the occurrence of bulging in the bead or tread portion was measured, and the measurement is expressed as an index relative to that of Comparative Example 1 (=100). A higher index indicates better tire durability.

(Viscoelasticity Test)

The complex elastic modulus E* (MPa) and loss tangent tan δ of each vulcanized rubber composition (fresh product) were measured using a viscoelasticity spectrometer VES available from Iwamoto Seisakusho Co., Ltd. at a temperature of 70° C., a frequency of 10 Hz, an initial strain of 10%, and a dynamic strain of 2%. Higher E* indicates higher rigidity and better handling stability. Lower tan δ indicates lower heat build-up and better fuel economy.

(Tensile Test)

Using No. 3 dumbbell test pieces prepared from the vulcanized rubber compositions (fresh products and dry heat aged products), a tensile test was performed at room temperature in accordance with JIS K 6251 "Rubber, vulcanized or thermoplastic—Determination of tensile stress-strain properties" to measure the elongation at break EB (%). Higher EB indicates better elongation at break.

(Adhesion Test (Score of Rubber Coverage after Peeling): Adhesion to Fiber Cords)

The samples for a peel test (fresh samples and hygrothermally aged samples) were subjected to an adhesion test to measure the rubber coverage ratio after peeling (the percentage of rubber coverage on the peeled surface when the rubber was peeled from the fiber cords). The results are presented on a 5-point scale. A score of 5 points indicates full coverage, and a score of 0 points indicates no coverage. A higher score indicates better adhesion to fiber cords.

(Processability (Extrusion Processability))

Each of the unvulcanized rubber compositions was extruded and formed into a sheet. The sheet was compressed and rolled onto the upper and lower surfaces of polyester fiber cords to coat the cords, and the resulting product was subjected to sensory evaluation visually and by touch on a 5-point scale with respect to five indicators listed below. A higher score indicates better extrusion processability.

(1) Tackiness on the sheet surface (evaluated throughout the period from immediately after forming the sheet to after allowing the sheet to stand at room temperature for one day)

(2) White blooming caused by deposits such as sulfur and zinc stearate (3) Compound scorch (4) Flatness (5) Edge profile As for the edge profile, the straightest and smoothest edges were evaluated as being good. As for the compound scorch, a 15-cm square, 2 mm-thick sheet, which was cut out of each formed product, was evaluated as being good if it had no irregularities due to cured bits. As for the flatness, if such a sheet was flat enough to adhere tightly to a flat plate, it was evaluated as being good.

(Cost)

The following is a list of materials arranged in order from most expensive to least expensive in terms of the unit price: conductive carbon blacks, metal (Zn) having a high specific gravity, complicated organic compounds (modified resorcinol resin and HMMPME), organic chemical agents (vulcanization accelerators and antioxidants)>organic materials (NR, SBR, and C5 petroleum resin)>sulfurs>silica>carbon blacks>oil. Reducing the use of materials having a high unit price leads to a lower formulation cost. The formulation cost was evaluated as follows.

Least expensive 5 4 3 2 1 Most expensive

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|
| Amount (part(s) by mass) | | | | | | | | | | | | | | | | | |
| Filler | NR | 70 | 70 | 70 | 70 | 70 | 70 | 70 | 70 | 70 | 70 | 70 | 70 | 70 | 70 | 100 | 70 |
| | SBR | 30 | 30 | 30 | 30 | 30 | 30 | 30 | 30 | 30 | 30 | 30 | 30 | 30 | 30 | — | 30 |
| | Silica | — | — | — | — | — | — | — | — | — | — | — | — | — | — | 5 | — |
| | Carbon black 1 (N326, BET84, DBP74, Fe 2 ppm) | — | — | 10 | 30 | 40• | — | — | — | — | — | 10 | — | — | — | 45 | — |
| | Carbon black 2 (N330, BET78, DBP102, Fe 2 ppm) | 40 | 40 | 5 | — | — | 40 | 40 | 40 | 40 | 40 | 35 | 40 | 42 | — | — | 40 |
| | Conductive carbon black 1 (purified product of Lionite, DBP378, BET1052, Fe 300 ppm) | — | 2 | — | — | — | — | — | — | — | — | — | — | — | 40 | — | — |
| | Conductive carbon black 2 (Lionite, DBP378, BET1052, Fe 1330 ppm) | 2 | — | 10 | 7 | 2 | 2 | 2 | 2 | 2 | 2 | 2 | 2 | 1 | 2 | 5 | 2 |
| | Total Fe element content derived from carbon black (ppm) Target value: 150 ppm or less | 27.4 | 6.8 | 133.1 | 93.1 | 27.4 | 27.4 | 27.4 | 27.4 | 27.4 | 27.4 | 27.3 | 27.4 | 14.1 | 27.4 | 67.4 | 27.4 |
| | Silane coupling agent | — | — | 2.4 | — | — | — | — | — | — | — | — | — | — | — | — | — |
| Antioxidant | Antioxidant 1 | 1 | 1 | 1 | 1 | 1 | 1 | 1 | 1 | 1 | 1 | 1 | 1 | 1 | 1 | 2 | 1 |
| | Antioxidant 2 | — | — | — | — | — | — | — | — | — | — | — | — | — | — | 2 | — |
| Softener | C5 petroleum resin | 2 | 2 | 2 | 2 | 2 | 2 | 2 | 2 | 2 | 2 | 2 | 2 | 2 | 2 | — | 2 |
| | TDAE oil | 8 | 8 | 8 | 8 | 8 | 8 | 8 | 8 | — | — | — | 8 | 8 | — | — | 8 |
| | Liquid coumarone-indene resin | — | — | — | — | — | — | — | — | — | — | 8 | — | — | — | — | — |
| vulcanization activator | Zinc Oxide | 3 | 3 | 3 | 3 | 3 | 3 | 3 | 5 | 5 | 5 | 8 | 1.5 | 3 | 6 | 8 | 3 |
| | Cobalt stearate | — | — | — | — | — | — | 1.06 (1.01) | — | — | — | — | — | — | — | 1 | — |
| | Stearic acid | 2 | 2 | 2 | 2 | 2 | 2 | 2 | 2 | 2 | 2 | 2 | 2 | 2 | 3 | — | 2 |
| Sulfur | Insoluble sulfur A (Fe 15 ppm) | 3.75 (3.00) | 3.75 (3.00) | 3.75 (3.00) | 3.75 (3.00) | 1.25 (1.00) | 1.25 (1.00) | 1.00 (0.80) | 2.50 (2.00) | 1.25 (1.00) | 4.37 (3.50) | 3.50 (2.80) | 3.75 (3.00) | 3.75 (3.00) | 3.75 (3.00) | 3.50 (2.80) | 3.75 (3.00) |
| | Insoluble sulfur B (Fe 50 ppm) | — | — | — | — | 2.50 (2.00) | — | 1.50 (1.20) | — | — | — | 3.50 (2.80) | — | — | — | 2.75 (2.20) | — |
| | Insoluble sulfur C (Fe 200 ppm) | — | — | — | — | — | 2.50 (2.00) | — | — | — | — | — | — | — | — | — | — |
| | Powder sulfur (Fe 20 ppm) | — | — | — | — | — | — | — | — | — | — | — | — | — | — | — | — |
| | Total net sulfur content | 3.00 | 3.00 | 3.00 | 3.00 | 3.00 | 3.00 | 3.01 | 2.00 | 1.00 | 3.50 | 5.60 | 3.00 | 3.00 | 3.00 | 5.00 | 3.00 |
| | Total Fe element content derived from sulfur (ppm) Target value: 6 ppm or less | 0.56 | 0.56 | 0.56 | 0.56 | 1.44 | 5.19 | 1.11 | 0.38 | 0.19 | 0.66 | 2.28 | 0.56 | 0.56 | 0.56 | 1.90 | 0.56 |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|
| Vulcanization accelerator 1 (CBS) | 1.0 | 1.0 | 1.0 | 1.0 | 1.0 | 1.0 | 1.0 | 1.0 | — | 0.6 | — | 1.0 | 1.0 | 1.0 | — | 1.0 |
| Vulcanization accelerator 2 (DCBS) | — | — | — | — | — | — | — | — | 2.0 | — | 0.5 | — | — | — | 0.7 | — |
| HMMPME | — | — | — | — | — | — | — | 1.75 | 2.5 | — | — | — | — | 1.2 | — | — |
| Modified resorcinol resin | — | — | — | — | — | — | — | 1.5 | 2.0 | — | — | — | — | 1.0 | — | — |
| Evaluation results | | | | | | | | | | | | | | | | |
| Volume resistivity (MΩ · cm(=10⁶Ω · cm)) | 7.5 | 7.7 | 0.12 | 0.55 | 7.6 | 6.8 | 7.1 | 6.9 | 3.2 | 7.9 | 7.7 | 8.1 | 15.4 | 12.7 | 75 | 7.5 |
| Tire durability (heavy load durability drum test) (target value ≥ 105) | 130 | 135 | 115 | 135 | 120 | 110 | 105 | 140 | 125 | 135 | 105 | 110 | 135 | 130 | — | 125 |
| Handling stability (E* at 70° C., target value 4.8-6.0) | 5.35 | 5.33 | 5.45 | 5.22 | 5.15 | 5.22 | 5.65 | 4.95 | 5.01 | 5.8 | 5.75 | 5.01 | 5.44 | 5.97 | 5.98 | 5.37 |
| Fuel economy (tanδ at 70° C., target value < 0.14) | 0.117 | 0.115 | 0.137 | 0.122 | 0.121 | 0.124 | 0.124 | 0.139 | 0.137 | 0.112 | 0.105 | 0.125 | 0.112 | 0.111 | 0.129 | 0.119 |
| Elongation at break (fresh product)(EB % @RT) (target value > 450) | 500 | 520 | 480 | 535 | 485 | 475 | 475 | 595 | 575 | 460 | 455 | 485 | 505 | 465 | 455 | 500 |
| Elongation at break (dry heat aged product) (EB % @RT) (target value > 250, high level > 330) | 305 | 315 | 285 | 315 | 275 | 270 | 270 | 385 | 380 | 260 | 255 | 265 | 315 | 265 | 255 | 295 |
| Adhesion to fiber cords (fresh sample) (target value ≥ 3.0) | 4+ | 4+ | 3+ | 4 | 3+ | 3 | 3 | 4 | 3+ | 5 | 5 | 3+ | 4+ | 5 | 5 | 4+ |
| Adhesion to fiber cords (hygrothermally aged sample) (target value ≥ 3.0) | 3+ | 3+ | 3 | 3 | 3 | 3 | 3 | 3 | 3 | 4 | 4 | 3 | 4 | 4+ | 4+ | 3 |
| Extrusion processability (target value ≥ 3.0) | 4 | 4 | 3 | 3 | 3+ | 3 | 3 | 4 | 3+ | 4 | 4 | 4 | 4 | 4 | 4 | 3+ |
| Cost (least expensive 5 4 3 2 1 most expensive) | 4 | 4− | 3 | 3 | 5 | 5 | 5 | 3 | 3 | 4 | 4 | 5 | 4 | 4 | 3 | 4 |

TABLE 2

| | | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|
| Amount (part(s) by mass) | | | | | | | | | |
| | NR | 70 | 70 | 70 | 70 | 70 | 70 | 70 | 70 |
| | SBR | 30 | 30 | 30 | 30 | 30 | 30 | 30 | 30 |
| Filler | Silica | — | — | — | 10 | — | — | 10 | — |
| | Carbon black 1 (N326, BET84, DBP74, Fe 2 ppm) | — | — | — | — | — | — | — | — |
| | Carbon black 2 (N330, BET78, DBP102, Fe 2 ppm) | 40 | 40 | 44 | — | 40 | 30 | 5 | 45 |
| | Conductive carbon black 1 (purified product of Lionite, DBP378, BET1052, Fe 300 ppm) | — | 2 | — | — | — | — | — | — |
| | Conductive carbon black 2 (Lionite, DBP378, BET1052, Fe 1330 ppm) | 2 | — | 0.3 | 17 | 2 | 2 | 10 | — |
| | Total Fe element content derived from carbon black (ppm) Target value: 150 ppm or less | 27.4 | 6.8 | 4.9 | 226.1 | 27.4 | 27.2 | 133.1 | 0.9 |
| | Silane coupling agent | — | — | — | — | — | — | — | — |
| Antioxidant | Antioxidant 1 | 1 | 1 | 1 | 1 | 1 | 1 | 1 | 1 |
| | Antioxidant 2 | — | — | — | — | — | — | — | — |
| Softener | C5 petroleum resin | 2 | 2 | 2 | 2 | 2 | 2 | 2 | 2 |
| | TDAE oil | 8 | 8 | 8 | 8 | — | — | 8 | 8 |
| | Liquid coumarone-Indene resin | — | — | — | — | — | 8 | — | — |
| vulcanization activator | Zinc oxide | 3 | 3 | 3 | 3 | 5 | 8 | 3 | 3 |
| | Stearic acid | 2 | 2 | 2 | 2 | 2 | 2 | 2 | 2 |
| Sulfur | Insoluble sulfur A (Fe 15 ppm) | — | — | 3.75 (3.00) | 3.75 (3.00) | 1.00 (0.80) | 8.00 (6.40) | — | 3.75 (3.00) |
| | Insoluble sulfur B (Fe 50 ppm) | — | — | — | — | — | — | — | — |
| | Insoluble sulfur C (Fe 200 ppm) | 3.75 (3.00) | 3.75 (3.00) | — | — | — | — | 3.75 (3.00) | — |
| | Powder sulfur (Fe 20 ppm) | — | — | — | — | — | — | — | — |
| | Total net sulfur content | 3.00 | 3.00 | 3.00 | 3.00 | 0.80 | 6.40 | 3.00 | 3.00 |
| | Total Fe element content derived from sulfur (ppm) Target value: 6 ppm or less | 7.50 | 7.50 | 0.56 | 0.56 | 0.15 | 1.20 | 7.50 | 0.56 |
| | Vulcanization accelerator 1 (CBS) | 1.0 | 1.0 | 1.0 | 0.7 | — | — | 1.0 | 1.0 |
| | Vulcanization accelerator 2 (DCBS) | — | — | — | — | 2.0 | 0.3 | — | — |
| | HMMPME | — | — | — | — | 3 | — | — | — |
| | Modified resorcinol resin | — | — | — | — | 2.5 | — | — | — |
| Evaluation results | | | | | | | | | |
| Volume resistivity (MΩ·cm(=$10^6$Ω·cm)) | | 8.1 | 8.0 | 224.5 | 0.075 | 4.1 | 8.4 | 0.11 | 285 |
| Tire durability(heavy load durability drum test) (target value ≥ 105) | | 100 | 105 | 110 | 85 | 70 | 40 | 90 | 110 |
| Handling stability(E* at 70° C., target value 4.8-6.0) | | 5.21 | 5.24 | 5.44 | 5.74 | 4.87 | 5.27 | 5.34 | 5.27 |
| Fuel economy(tanδ at 70° C., target value < 0.14) | | 0.127 | 0.125 | 0.115 | 0.165 | 0.168 | 0.113 | 0.141 | 0.113 |
| Elongation at break (fresh product)(EB % @RT) (target value > 450) | | 465 | 475 | 500 | 530 | 440 | 355 | 460 | 505 |
| Elongation at break (dry heat aged product) (EB % @RT) (target value > 250, high level > 330) | | 265 | 270 | 305 | 325 | 240 | 140 | 245 | 305 |
| Adhesion to fiber cords (fresh sample) (target value ≥ 3.0) | | 3 | 3 | 5 | 3+ | 2+ | 4+ | 2 | 5 |
| Adhesion to fiber cords (hygrothermally aged sample) (target value ≥ 3.0) | | 2 | 2+ | 3+ | 2 | 2 | 4 | 2− | 3+ |
| Extrusion processability (target value ≥ 3.0) | | 2 | 3 | 4 | 1 | 3 | 3 | 2 | 4 |
| Cost (least expensive 5 4 3 2 1 most expensive) | | 4 | 4 | 5 | 1 | 2 | 3 | 3 | 5 |

Each of the rubber compositions in the examples includes, per 100 parts by mass of a rubber component: 1.0 to 3.5 parts by mass of a sulfur with an iron content of 30 ppm or less, calculated as the net sulfur content in the sulfur; and 0.5 to 15 parts by mass of a conductive carbon black having a dibutyl phthalate oil absorption of 300 ml/100 g or more and an iron content of 60 ppm or more, wherein the rubber composition has a total net sulfur content of 1.0 to 6.0 parts by mass per 100 parts by mass of the rubber component, and has a volume resistivity of $1.0 \times 10^8$ Ω·cm or less. These rubber compositions exhibited both adhesion to fiber cords and conductivity even though an inexpensive conductive carbon black, i.e., a conductive carbon black with a high iron content was used, and thus they achieved a balanced improvement in conductivity, handling stability, fuel economy, elongation at break, adhesion to fiber cords, processability, and tire durability.

REFERENCE SIGNS LIST

2 Pneumatic tire
4 Tread
5 Clinch
6 Inner liner
7 Rim
8 Sidewall
10 Carcass
12 Breaker 15 Jointless band
16 Wing
44 Inner layer
46 Outer layer
50 Conducting rubber
51 Undertread

The invention claimed is:

1. A pneumatic tire, comprising
a component comprising a rubber composition for a tire, the rubber composition comprising, per 100 parts by mass of a rubber component:
1.0 to 3.5 parts by mass of a sulfur with an iron content of 30 ppm or less, calculated as a net sulfur content in the sulfur; and
0.5 to 15 parts by mass of a conductive carbon black having a dibutyl phthalate oil absorption of 300 ml/100 g or more and an iron content of 60 ppm or more,
wherein the rubber composition has a total net sulfur content of 1.0 to 6.0 parts by mass per 100 parts by mass of the rubber component, and has a volume resistivity of $1.0 \times 10^8$ Ω·cm or less,
wherein the sulfur with an iron content of 30 ppm or less is an insoluble sulfur with an iron content of 30 ppm or less.

2. The pneumatic tire according to claim 1,
wherein the conductive carbon black has an iron content of 300 ppm or more, and
the rubber composition has a volume resistivity of $1.0 \times 10^7$ ·cm or less.

3. The pneumatic tire according to claim 1,
wherein the rubber composition comprises 1.6 to 8.0 parts by mass of zinc oxide per 100 parts by mass of the rubber component.

4. The pneumatic tire according to claim 1,
wherein the rubber composition has a total net sulfur content of 2.0 to 3.5 parts by mass per 100 parts by mass of the rubber component, and is for use as a rubber composition for a fiber cord topping.

5. The pneumatic tire according to claim 1,
wherein the component is a rubberized fiber cord component.

6. The pneumatic tire according to claim 5,
wherein the rubberized fiber cord component is at least one of a carcass and a jointless band.

* * * * *